(12) United States Patent
Joshi et al.

(10) Patent No.: US 12,326,207 B2
(45) Date of Patent: Jun. 10, 2025

(54) CABLE HANGER WITH TYING SECTION AND STABILIZING MEMBERS

(71) Applicant: Outdoor Wireless Networks LLC, Claremont, NC (US)

(72) Inventors: Aviral Joshi, Chicago, IL (US); Ronald A. Vaccaro, Taylorsville, NC (US); Christopher Stockman, Bella Vista, AR (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/414,777

(22) Filed: Jan. 17, 2024

(65) Prior Publication Data
US 2024/0151325 A1 May 9, 2024

Related U.S. Application Data

(63) Continuation of application No. 17/577,570, filed on Jan. 18, 2022, now Pat. No. 11,913,575.
(Continued)

(51) Int. Cl.
*F16L 3/10* (2006.01)

(52) U.S. Cl.
CPC .................. *F16L 3/1058* (2013.01)

(58) Field of Classification Search
CPC ....... F16L 3/1058; F16L 3/222; F16L 3/1222; F16L 3/1218; H02G 3/32; B65D 61/00
(Continued)

(56) References Cited

U.S. PATENT DOCUMENTS

| 5,921,520 | A | * | 7/1999 | Wisniewski | .............. F16L 3/12 248/316.1 |
| 8,191,836 | B2 | | 6/2012 | Korczak | |

(Continued)

FOREIGN PATENT DOCUMENTS

| JP | 2009273209 A | 11/2009 |
| WO | 2019043367 A1 | 3/2019 |
| WO | 2020193722 A1 | 10/2020 |

OTHER PUBLICATIONS

International Search Report and Written Opinion corresponding to PCT/US2022/013219; Mailed May 12, 2022, (11 pages).
(Continued)

*Primary Examiner* — Muhammad Ijaz
(74) *Attorney, Agent, or Firm* — Myers Bigel, P.A.

(57) ABSTRACT

A cable hanger includes: a generally flat base with at least one opening; first and second arms extending in a first direction from opposite edges of the base; first and second locking members extending in the first direction from, respectively, ends of the first and second arms, each of the locking members comprising a respective hook; first and second gripping members, each of the first and second gripping members extending from the base or one of the arms and forming a pocket configured to receive and grasp a cable; and first and second stabilizing features, each mounted to and extending from a respective one of the first and second locking members. The first and second locking members are forced toward each other to mount the cable hanger in a mounting location vis the hooks, such movement causing the first and second gripping members to grasp a cable in the pocket. The first and second stabilizing features are configured so that engagement of the first and second stabilizing members inhibits relative movement of the first and second locking members.

20 Claims, 7 Drawing Sheets

Related U.S. Application Data

(60) Provisional application No. 63/168,442, filed on Mar. 31, 2021.

(58) Field of Classification Search
USPC .......................... 248/73, 68.1, 63, 74.1, 74.2
See application file for complete search history.

(56) References Cited

U.S. PATENT DOCUMENTS

| | | | | |
|---|---|---|---|---|
| 9,866,004 | B2* | 1/2018 | Vaccaro | ............... G09F 15/0075 |
| 10,253,906 | B2 | 4/2019 | Vaccaro | |
| 10,422,446 | B2 | 9/2019 | Joshi et al. | |
| 10,634,265 | B2 | 4/2020 | Joshi et al. | |
| 10,823,312 | B2 | 11/2020 | Vaccaro et al. | |
| 11,415,243 | B2* | 8/2022 | Vaccaro | ..................... F16L 3/13 |
| 2006/0249633 | A1* | 11/2006 | Korczak | ..................... F16L 3/24 |
| | | | | 248/62 |
| 2009/0294602 | A1* | 12/2009 | Korczak | ................. H02G 3/30 |
| | | | | 248/74.1 |
| 2014/0061412 | A1* | 3/2014 | Suzuki | ..................... F16B 37/02 |
| | | | | 248/226.11 |
| 2014/0131529 | A1 | 5/2014 | Feige | |
| 2014/0306071 | A1* | 10/2014 | Stechmann | ............... H02G 3/32 |
| | | | | 248/65 |
| 2017/0122460 | A1* | 5/2017 | Joshi | ...................... F16B 45/005 |
| 2017/0204995 | A1* | 7/2017 | Leng | ........................ H02G 3/32 |
| 2018/0045336 | A1 | 2/2018 | Vaccaro | |
| 2018/0149292 | A1* | 5/2018 | Vaccaro | ................... H02G 3/32 |
| 2018/0356006 | A1* | 12/2018 | Joshi | ...................... F16L 3/127 |
| 2019/0178419 | A1* | 6/2019 | Vaccaro | ................... H02G 3/32 |
| 2020/0041039 | A1* | 2/2020 | Varale | ..................... F16L 3/222 |
| 2021/0010617 | A1 | 1/2021 | Vaccaro et al. | |
| 2021/0281059 | A1 | 9/2021 | Vaccaro et al. | |

OTHER PUBLICATIONS

"Extended European Search Report corresponding to European Application No. 22781795.4 dated Jan. 2, 2025".

* cited by examiner

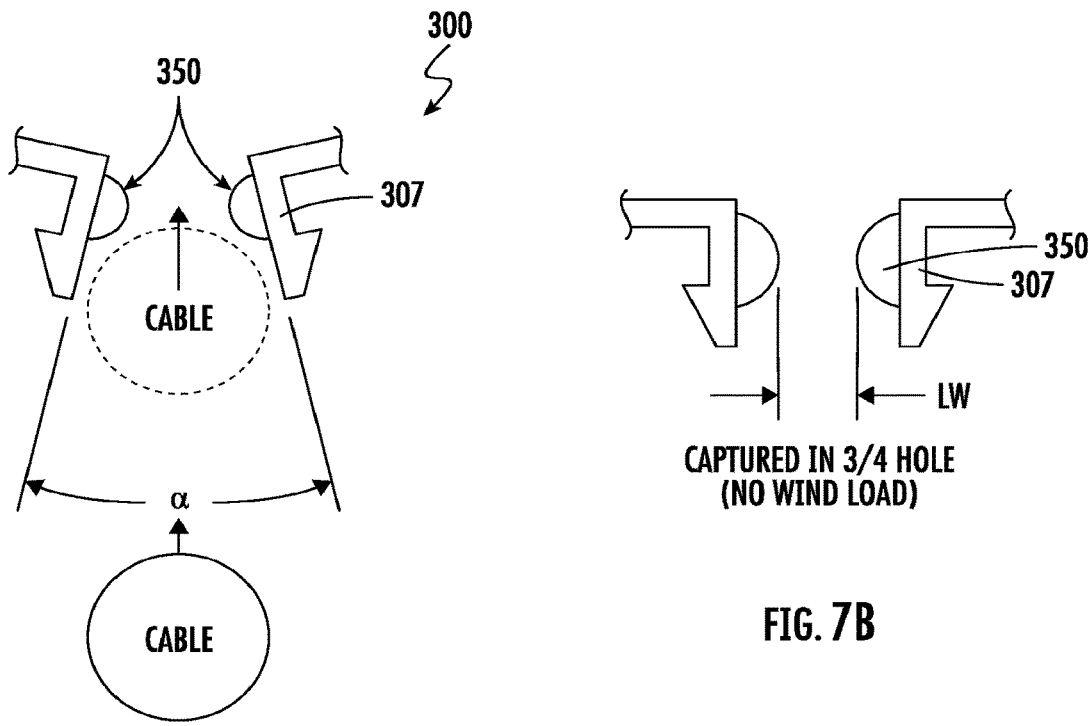
FIG. 7A
FIG. 7B
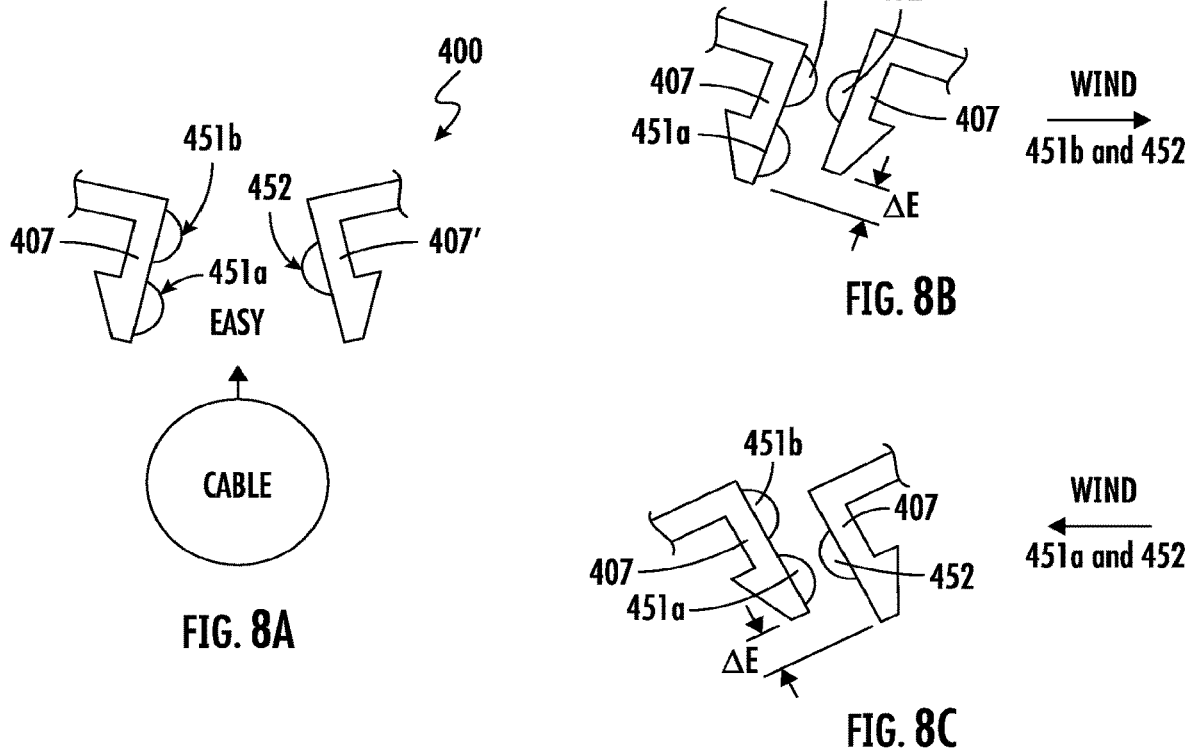
FIG. 8A
FIG. 8B
FIG. 8C

TOP

SIDE

BACK

CABLE HANGER WITH TYING SECTION AND STABILIZING MEMBERS

RELATED APPLICATION

This application is a continuation of U.S. patent application Ser. No. 17/577,570, filed Jan. 18, 2022, which claims priority from and the benefit of U.S. Provisional Patent Application No. 63/168,442, filed Mar. 31, 2021, the disclosures of which are hereby incorporated by reference herein in their entireties.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and/or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable hangers significantly increase the number of cables mountable to a single attachment point.

One popular stackable cable hanger is discussed in U.S. Pat. No. 8,191,836 to Korczak, the disclosure of which is hereby incorporated herein in its entirety. Hangers disclosed therein have generally a U- or C-shaped profile with rounded arms. A locking projection extends from the free end of each arm, and the "root" of the hanger that spans the fixed ends of the arms has a large aperture. The hanger can hold a cable between the arms; gripping of the cable is enhanced by short fingers that extend inwardly from the arms to engage the cable. Hangers can be "stacked" onto each other by inserting the locking projections of one hanger into the large aperture of the next hanger.

One variety of cable hanger of this type is the SNAP-STAK® hanger, available from CommScope, Inc. (Joliet, Illinois). The SNAP-STAK® hanger is offered in multiple sizes that correspond to the outer diameters of different cables. This arrangement has been suitable for use with coaxial power cables, which tend to be manufactured in only a few different outer diameters. Modified versions of these hangers are discussed in U.S. Pat. No. 9,866,004 to Vaccaro, hereby incorporated herein by reference in full; these arrangements may be more desirable for fiber optic and hybrid cables, which tend to be manufactured in a much greater variety of diameters, and which tend to be much heavier than coaxial cables (sometimes as much as three times heavier per unit foot), which induces greater load and stress on the hangers. Additional hanger configurations are discussed in U.S. Pat. Nos. 10,253,906; 10,823,312; 10,422,446; and 10,634,265, all of which are hereby incorporated herein by reference in full.

It may be desirable to provide additional cable hanger designs.

SUMMARY OF THE INVENTION

As a first aspect, embodiments of the invention are directed to a cable hanger. The cable hanger comprises: a generally flat base with an opening; first and second arms extending in a first direction from opposite edges of the base; first and second locking members extending in the first direction from, respectively, ends of the first and second arms, each of the locking members comprising a respective hook; first and second gripping members, each of the first and second gripping members extending from the base or one of the arms and forming a pocket configured to receive and grasp a cable; a support member extending from the base or one of the arms, the support member sized and positioned to engage the first gripping member when the first gripping member deflects to grasp a cable; and a flexible tying section extending between the support member and the first gripping members. The tying section is configured such that, when the cable hanger is not grasping a cable, the tying section has slack therein, but that sufficient deflection of the first gripping while grasping a cable can cause the tying section to become taut, thereby providing additional support to the first gripping member.

As a second aspect, embodiments of the invention are directed to a cable hanger comprising: a generally flat base with at least one opening; first and second arms extending in a first direction from opposite edges of the base; first and second locking members extending in the first direction from, respectively, ends of the first and second arms, each of the locking members comprising a respective hook; first and second gripping members, each of the first and second gripping members extending from the base or one of the arms and forming a pocket configured to receive and grasp a cable; and first and second stabilizing features, each mounted to and extending from a respective one of the first and second locking members. The first and second locking members are forced toward each other to mount the cable hanger in a mounting location via the hooks, such movement causing the first and second gripping members to grasp a cable in the pocket. The first and second stabilizing features are configured so that, when the cable hanger is mounted on a mounting structure and a side load is applied to one of the first and second arms, the first and second stabilizing members engage to inhibit relative movement of the first and second locking members.

As a third aspect, embodiments of the invention are directed to a cable hanger comprising: a generally flat base with at least one opening; first and second arms extending in a first direction from opposite edges of the base; first and second locking members extending in the first direction from, respectively, ends of the first and second arms, each of the locking members comprising a respective hook; first and second gripping members, each of the first and second gripping members extending from the base or one of the arms and forming a pocket configured to receive and grasp a cable; and first and second stabilizing features, each mounted to and extending from a respective one of the first and second locking members. The first and second locking members are forced toward each other to mount the cable hanger in a mounting location via the hooks, such movement causing the first and second gripping members to grasp a cable in the pocket. The first and second stabilizing features are configured so that engagement of the first and second stabilizing members inhibits relative movement of the first and second locking members.

BRIEF DESCRIPTION OF THE DRAWINGS

FIG. 7A is a partial front view of the locking members of another cable hanger according to embodiments of the invention.

FIG. 7B is a partial front view of the locking members of the cable hanger of FIG. 7A FIG. 8A is a partial front view of the locking members of a cable hanger according to further embodiments of the invention.

FIG. 8B is a partial front view of the locking members of the cable hanger of FIG. 8A under side load from the left side.

FIG. 8C is a partial front view of the locking members of the cable hanger of FIG. 8A under side load from the right side.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
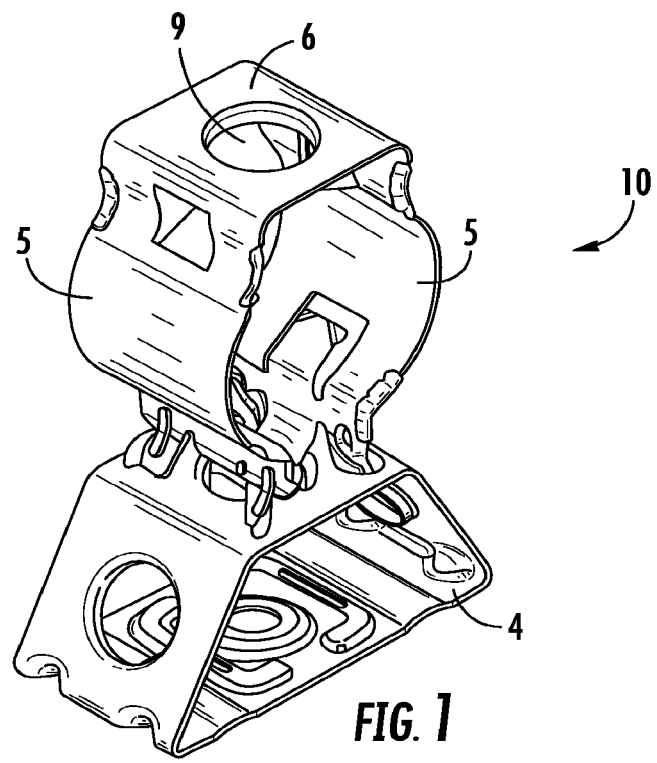
FIG. 1 is a perspective view of a prior art cable hanger.
Figure 2:
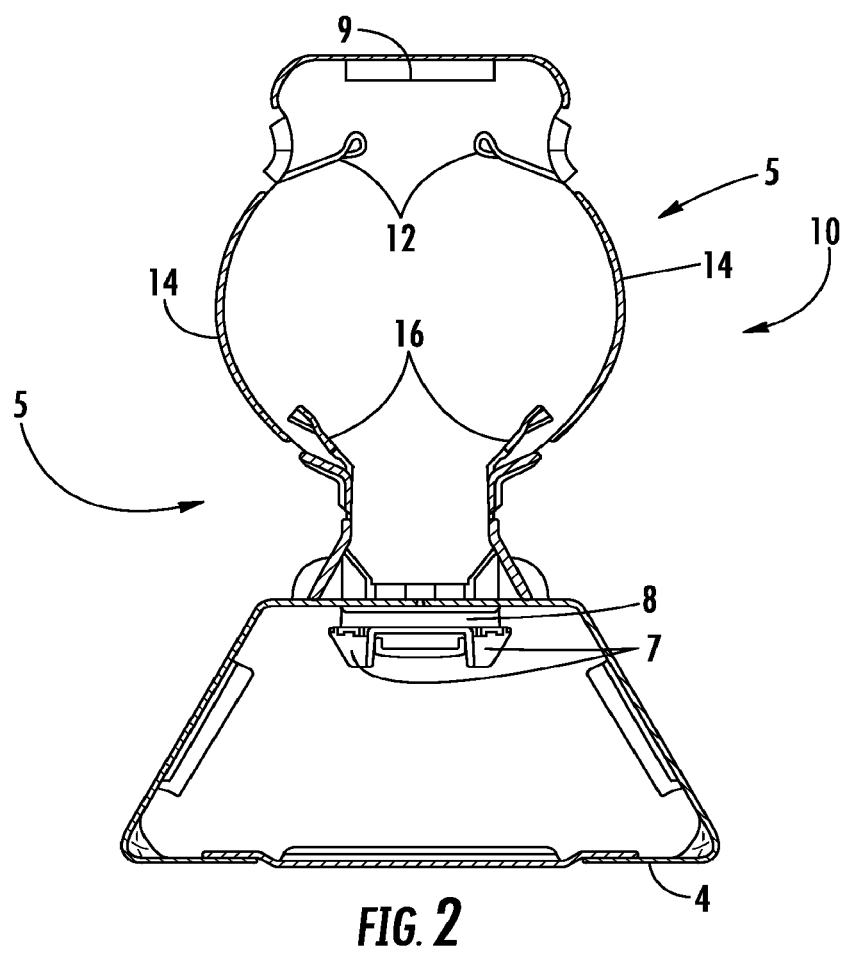
FIG. 2 is a top view of the prior art cable hanger of FIG. 1.

Referring now to the figures, a prior art cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can be grasped. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

Figure 3:
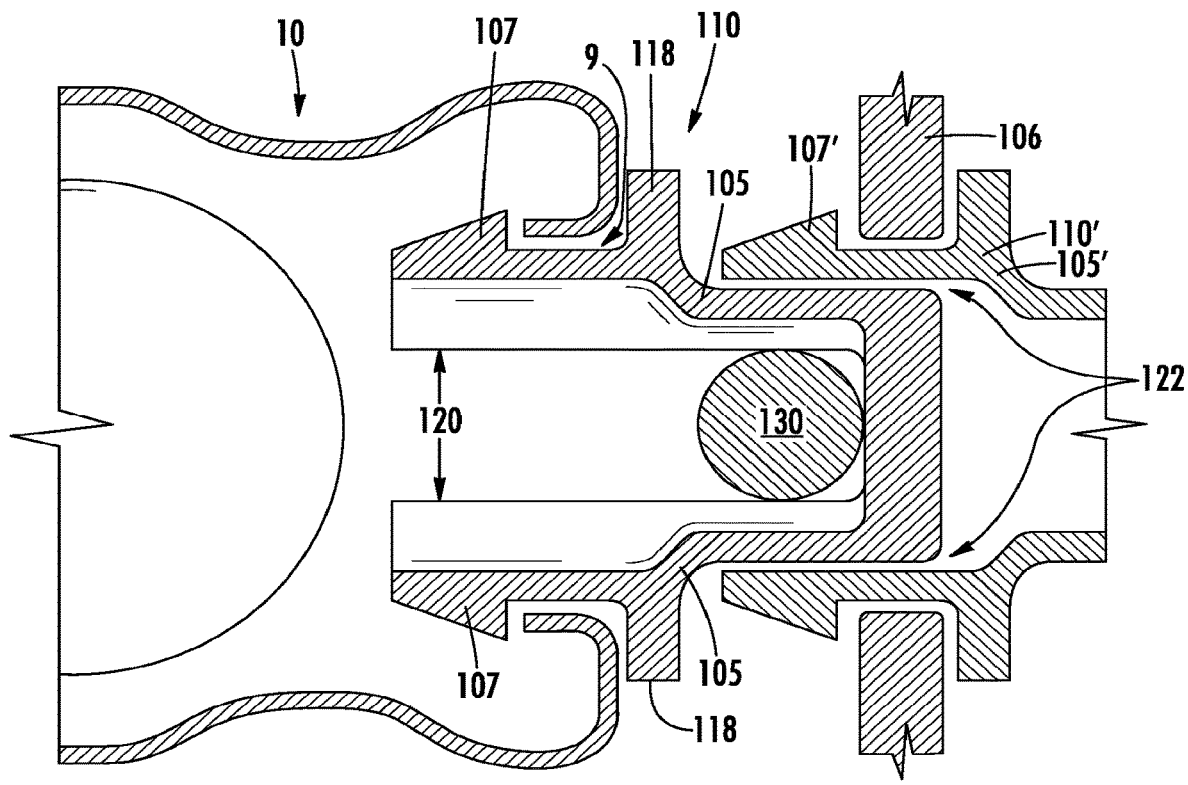
FIG. 3 is a top view of another prior art cable hanger mounted onto the prior art cable hanger as in FIG. 1.
Figure 4:
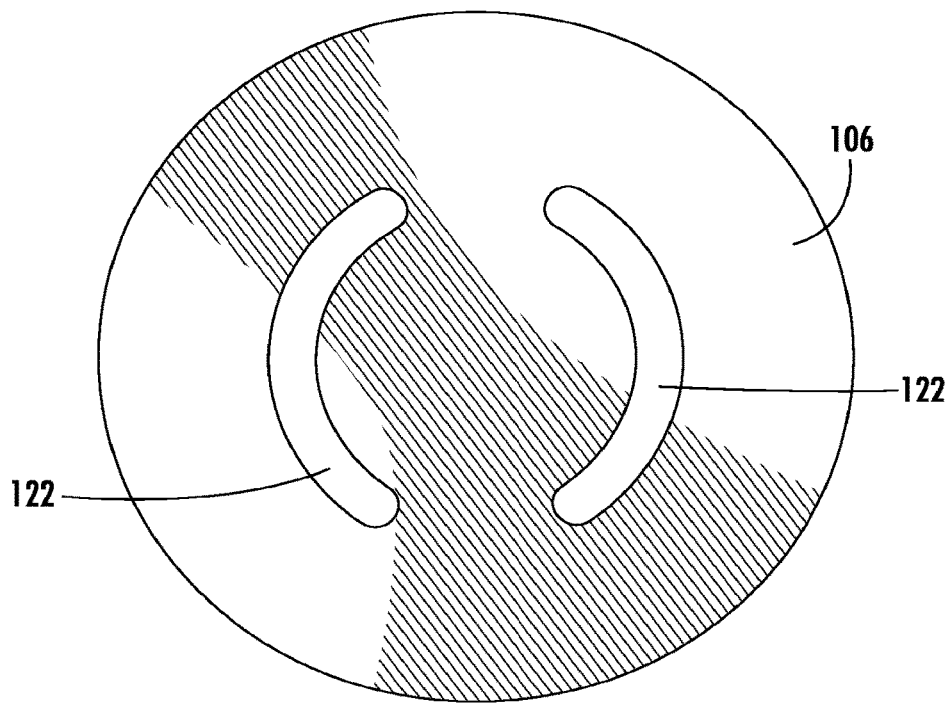
FIG. 4 is an end view of the cable hanger of FIG. 3.

The hanger 10, which is often formed of a metallic material such as steel, is popular for the mounting of larger coaxial cables, that tend to be provided in relatively few different sizes, but may be less popular for smaller cables. FIGS. 3 and 4 illustrate a cable hanger, designated broadly at 110, that may be employed with hangers 10 or by themselves to mount smaller cables. As illustrated, the cable hanger 110 includes a base 106 with two opposed arms 105 extending from the base 106. Each of the arms 105 is arcuate in profile. A hook 107 is located at the free end of each arm 105. Each arm 105 also has a radially-outwardly-extending stop 118. A gap 120 is present between the arms 105. Arcuate slots 122 are present in the base adjacent and radially outwardly of the fixed ends of the arms 105.

As can be seen in FIG. 3, the cable hanger 110 can be used to mount a cable to a cable hanger 10. A cable 130 is positioned in the gap 120 between the arms 105. The cable hanger 110 is then mounted in the hole 9 of the cable hanger 10 by aligning the arms 105 with the hole 9 and pushing the base 106 toward the cable hanger 10 (not unlike the motion used to insert a thumbtack). This motion deflects the free ends of the arms 105 toward each other to enable the hooks 107 to fit within the hole 9. The cable hanger 110 is pushed in the direction of the cable hanger 10 until the hooks 107 clear the edges of the hole 9, at which point the arms 105 deflect away from each other to secure the cable hanger 110 to the cable hanger 10. The inner edges of the arms 105 grip the cable 130.

As shown in FIG. 3, a second cable hanger 110' (which is only partially shown in FIG. 3) can be employed to mount a cable to the cable hanger 110. The hooks 107' of the arms 105' of the second cable hanger 110' are inserted into the slots 122 in the base 106 of the first cable hanger 110. Additional cable hangers can then be "stacked" onto the second cable hanger 110'.

It should also be apparent to those of skill in this art that the cable hanger 110 can be used to mount a cable directly to a mounting structure such as the tower 4 without an intervening cable hanger 10.

Those skilled in this art will appreciate that the cable hangers 110 discussed above are typically formed of a polymeric material, such as acetal resin, and may be formed as a unitary member (often via injection molding). The cable hangers 110 may also be configured to grasp different sizes of cables: for example, one size of hanger may be employed to mount cables having an outer jacket with a 4-7 mm diameter (DOJ), another size of hanger may mount 7-10 mm DOJ cables, and a third size of hanger may mount 10-14 mm DOJ cables. Additional configurations for polymeric cable hangers are shown and described in U.S. Pat. No. 10,253, 906, supra.

Figure 5:
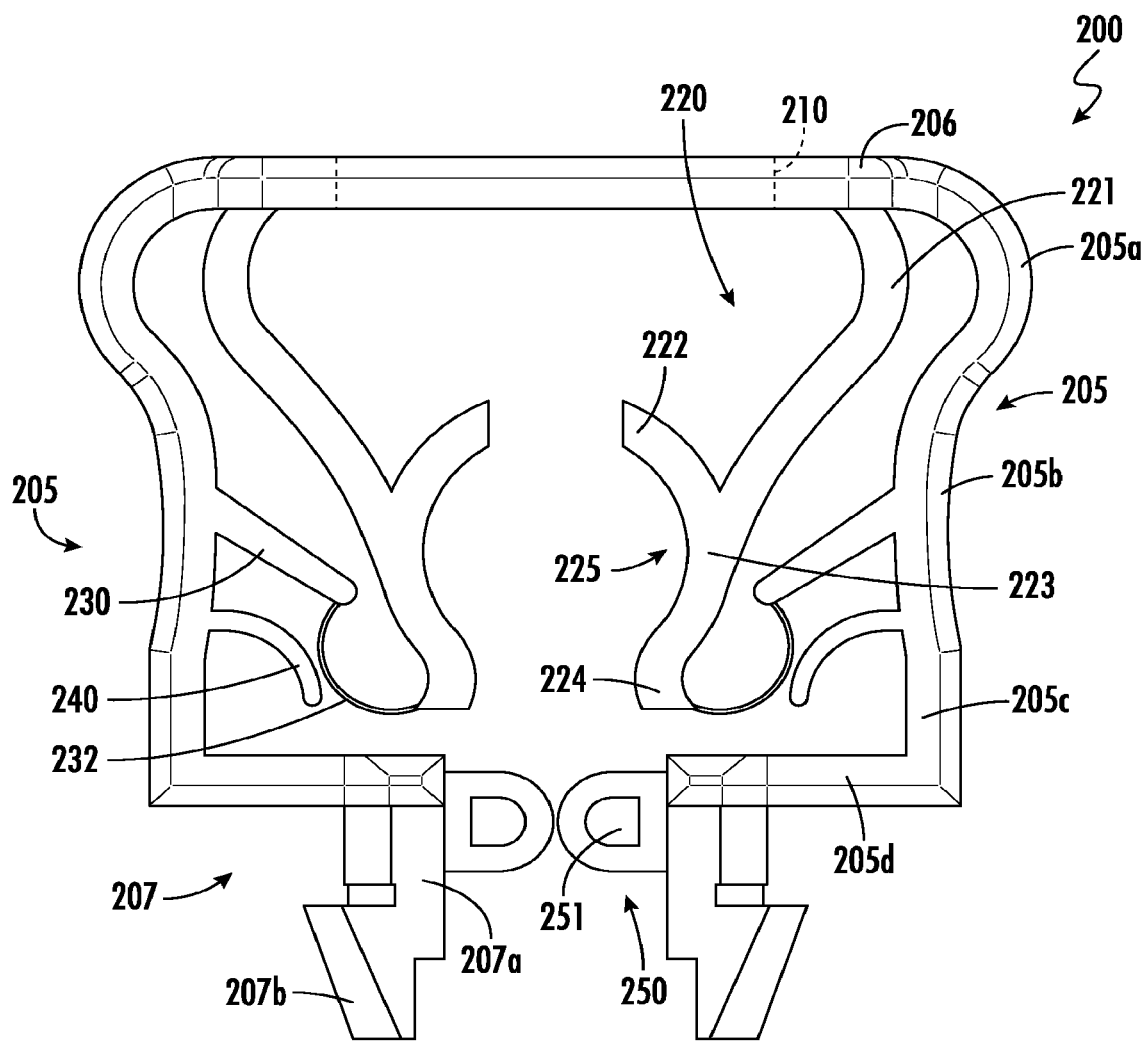
FIG. 5 is a front view of a cable hanger according to embodiments of the invention.

Referring now to FIG. 5, a cable hanger according to embodiments of the invention is shown therein and designated broadly at 200. The cable hanger 200 includes a base 206 with arms 205 that originate from the base 205 and extend generally perpendicularly therefrom. Each of the arms 205 includes an arcuate portion 205a, a concave portion 205b, and a straight segment 205c, and an inwardly-directed section 205d.

The base 206 includes a mounting hole 210 therein that can serve as a location for the mounting of an additional cable hanger. The mounting hole 210 is typically a nominally ¾ inch diameter unobstructed round hole. However, in some embodiments, the mounting hole 210 may have one or more members extending across it to subdivide the hole into sections; in some of those embodiments, the members may be configured to break away from the mounting hole 210 to provide a mounting location that can receive another cable hanger in a variety of orientations. Exemplary mounting holes are shown in, for example, U.S. Pat. No. 10,253,906, supra, and U.S. Patent Publication No. 2021/0281059, the disclosure of each of which is hereby incorporated herein by reference in full.

A locking portion 207 extends from the inward end of each inwardly-directed section 205d in a direction away from the base 206. Each of the locking portions 207 includes a base segment 207a and a hook 207b. In the illustrated embodiment, both the base segment 207a and the hook 207b are arcuate in profile, and are sized and configured to mount within a hole or sections of a hole such as that of mounting hole 210 described above.

As can be seen in FIG. 5, the cable hanger 200 includes two gripping members 220. Each of the gripping members 220 is mounted to the base 206 and extends therefrom toward the locking portions 207. Each of the gripping members 220 includes an arcuate main section 221, a cantilevered tab 222, an arcuate intermediate section 223, and a distal portion 224. The cantilevered tabs 222, the intermediate sections 223, and part of the distal portions 224 together define a pocket 225 within which a cable can be gripped. The cantilevered mounting of the gripping members 220 enables them to deflect toward the arms 205 to receive a cable, then recover somewhat from such deflection to grasp and hold a cable positioned in the pocket 225.

As can also be seen in FIG. 5, two different support members are mounted to each arm 205. A straight support member 230 is mounted near the center of the section 205b and extends at an oblique angle therefrom (in the illustrated embodiment, the straight support member 230 extends generally toward the vertex of the opposite inwardly-extending section 205d and the locking member 207). A thin, arcuate tying section 232 extends between the distal portion 224 of each gripping member 220 and the end of the straight support member 230. In addition, a curved support member 240 is mounted to the concave section 205b near the straight segment 205c and curves therefrom toward the adjacent inwardly-extending section 205d.

The support members 230, 240 are included to provide additional support and gripping force to the gripping members 220 for larger cables. It can be envisioned that, when smaller diameter cables are being grasped, the gripping members 220 deflect only slightly, such that space remains between the straight support members 230 and the gripping members 220. However, when grasping larger diameter cables, the gripping members 220 remain sufficiently deflected that the "rear" side of each gripping member 220 contacts the end of the straight support member 230. Such contact enables the straight support members 230 to provide additional support/gripping force to the gripping members 220. When grasping even larger diameter cables, the gripping members 220 deflect sufficiently that the distal portions 224 contact the curved support members 240, which can provide even more support/gripping force.

It can also be envisioned that the tying section 232 can provide even further support to the gripping members 220. When gripping smaller diameter cables, the tying sections 232 merely flex and remain slack, and do not participate substantially in supporting the gripping members 220. However, once the gripping member 220 has deflected sufficiently that the tying section 232 becomes taut (typically after the straight support member 230 contacts the gripping member 220), the tying section 232 unifies the gripping member 220 and the straight support member 230, thereby providing additional support/gripping force to the gripping members 220.

Those of skill in this art will appreciate that the gripping members 220, the support members 230, 240 and the tying section 232 may take other forms. For example, the gripping members 220 may be mounted on and extend from the arms 205, or even the locking members 207. Similarly, the support members 230, 240 may be mounted on a different section of the arms 205, the base 206 or the locking members 207. There may be more or fewer support members 230, 240, and/or they may take a different configuration. The tying sections 232 may extend between the gripping members 220 and a different support member (e.g., support member 240), and/or may have a different shape (e.g., instead of a smoothly arcuate profile, the tying sections 232 may be formed of two straight segments that are angled relative to each other, may be serpentine or undulating, may be "zig-zagged", etc.). Other forms will be apparent to those of skill in this art.

Referring still to FIG. 5, a stabilizing member 250 is mounted on the main body 207a of each locking member 207. As can be seen in FIG. 5, the stabilizing members 250 extend toward each other in the space between the main bodies 207a. The stabilizing members 250 are configured and arranged so that, when the locking members 207 are forced toward each other, the stabilizing members 250 engage and, in so engaging, resist the approaching movement of the locking members 207. In the illustrated embodiment, the stabilizing members 250 are hollow (with an interior space 251), which may provide the stabilizing members 250 to deflect somewhat when engaged with each other).

Figures 6A, 6B:
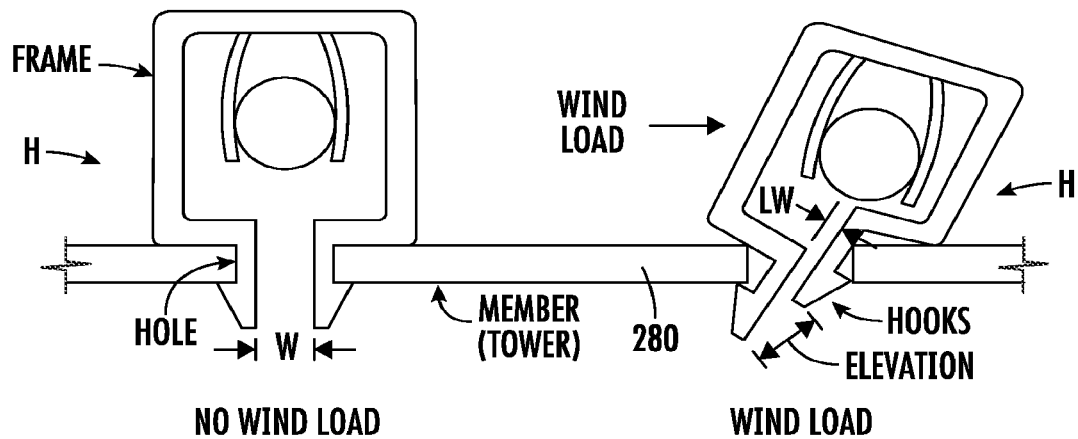
FIG. 6A is a schematic side view of an exemplary cable hanger mounted on a mounting surface.
FIG. 6B is a schematic side view of the cable hanger of FIG. 6A shown distorting under a side load.

One benefit of the stabilizing members 250 can be understood from FIGS. 6A and 6B, which show simplified, schematic versions H of the cable hanger 200 mounted in a mounting structure 280. Because cable hangers are often used on antenna towers and other structures employed to mount antennas, they are often mounted high above the ground in locations that experience significant wind velocity. As such, a cable hanger may be subjected to wind loading that, if directed as a side load on the cable hanger, may distort a cable hanger from a generally rectangular shape (FIG. 6A) to a "trapezoidal" shape (FIG. 6B). When the cable hanger distorts, the hooks of the locking members can become mislocated, the "elevation" of the hooks relative to each other may change, and the distance between the locking members can be reduced dramatically. These changes can be sufficiently pronounced that the cable hanger H may risk disengaging from the mounting structure 280 (as shown in FIG. 6B).

The presence of the stabilizing members 250 can resist movement of the locking members 207 toward each other under such circumstances by engaging each other after a small amount of deflection induced by wind loading. Such engagement can reduce or prevent further movement of the locking members 207, thereby providing a stabilizing effect on the wind-loaded cable hanger 200.

Those of skill in this art will appreciate that the stabilizing members 250 may be modified or replaced by other stabilizing features. For example, as shown in FIG. 7A, the locking members 307 of a cable hanger 300 may be splayed outwardly (for example, at an included angle α of between about 10-30 degrees) when the hanger 300 is in its relaxed condition. This arrangement may facilitate the entry of a cable to be grasped into the space defined by the arms, but still allow the stabilizing members 350 to engage each other once the cable hanger 300 is mounted (FIG. 7B) and subject to a high wind load.

FIGS. 8A and 8B illustrate another cable hanger 400 that includes two stabilizing members 451a, 451b on one locking member 407 and one stabilizing member 452 on the other locking member 407'. The stabilizing member 452 is longitudinally "offset" along its locking member 407' relative to the stabilizing members 451a, 451b such that, when the cable hanger 400 is mounted and under no wind load (FIG. 8A), the stabilizing member 452 is at an "elevation" that is between the respective elevations of the stabilizing members 451a, 451b. However, as shown in FIG. 8B, under a wind load, as the cable hanger 400 distorts, the relative movements of the locking members 407, 407' cause the stabilizing member 452 to align with and engage one of the stabilizing members 451a, 451b (depending on the direction of the wind loading). In addition, the offsetting of the stabilizing member 452 relative to the stabilizing members 451a, 451b can also make the entry of a cable into the space between the arms 406 easier.

Figure 9:
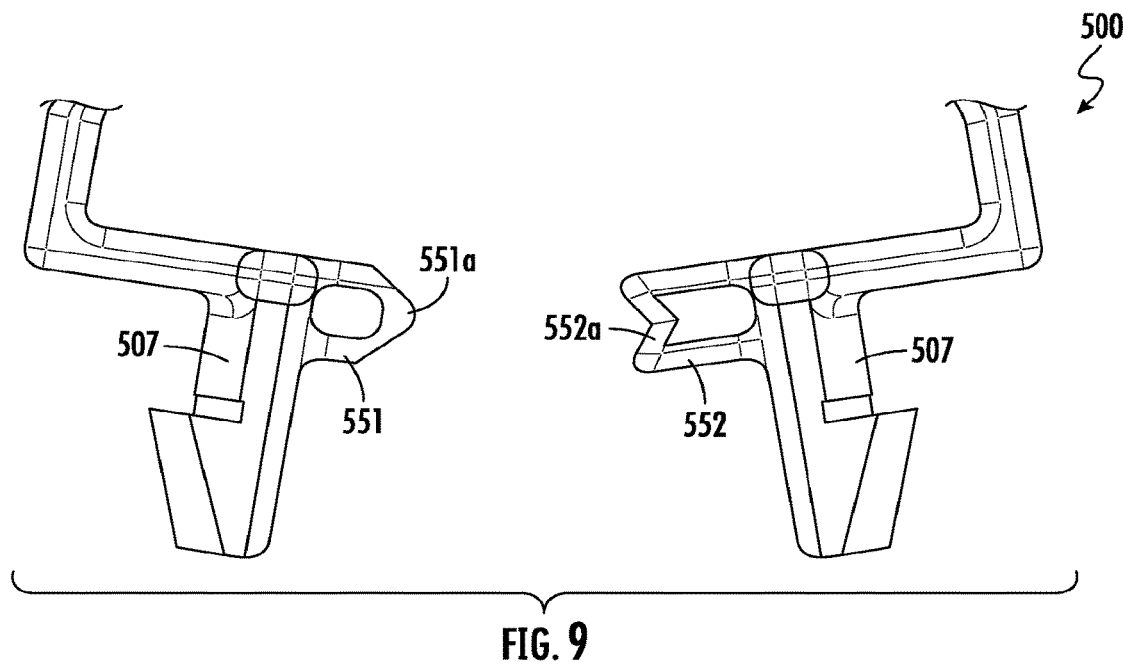
FIG. 9 is a partial front view of the locking members of a cable hanger according to still further embodiments of the invention.
Figure 10:
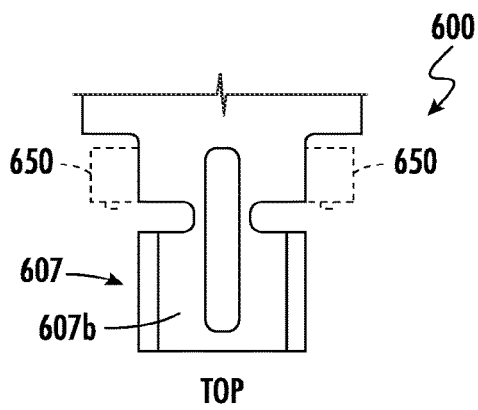
FIG. 10 is a partial side view of a locking members of a cable hanger according to additional embodiments of the invention, with the stabilizing member before bending shown in broken line.
Figure 11:
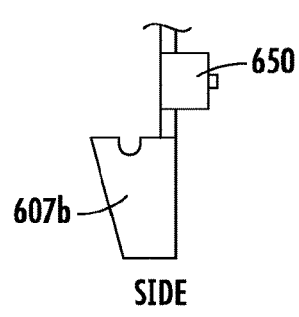
FIG. 11 is a front view of a locking member of FIG. 10.
Figure 12:
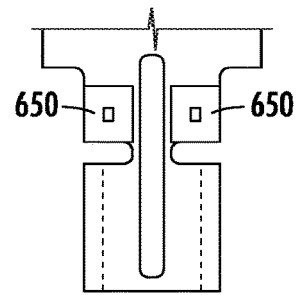
FIG. 12 is a partial side view of the locking member of FIG. 10, with the stabilizing member bent into place.
Figure 13:
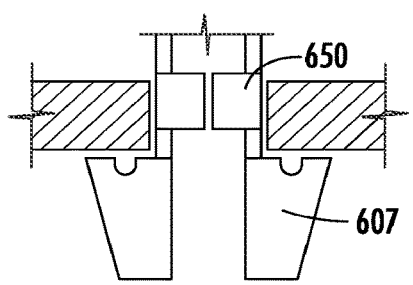
FIG. 13 is a partial front view of two locking members as in FIG. 10 mounted on a mounting substrate.

FIG. 9 illustrates a further cable hanger 500, which includes splayed locking members 507 as shown above in connection with cable hanger 300, and further includes stabilizing members 551, 552 extending from the locking members 507. As shown in FIG. 9, the stabilizing member 551 includes a convex end 551a, and the stabilizing member 552 includes a concave end 552a configured to compliment the convex end 551a. It can be envisioned that, when the cable hanger 500 is mounted on a mounting surface, the ends 551a, 552a are near each other; under a side load as described above, the shifting of the locking members 507 toward each other causes the ends 551a, 552a to engage, thereby preventing dislodging of the cable hanger 500.

The cable hangers 200, 300, 400, 500 may typically be formed of a polymeric material. However, cable hangers typically formed of metallic materials may also benefit from the inclusion of stabilizing members. For example, FIGS. 10-13 illustrate a cable hanger 600 similar to the cable hanger 10 shown above in FIGS. 1 and 2, which is typically formed of steel. The cable hanger 600 includes locking members 607 that have hooks 607b located at the free ends of locking members 607. Two stabilizing members 650 extend from the edges of each of the locking members 607. In the illustrated embodiment, the stabilizing members 650 extend both toward the opposing locking member 607 (i.e., into the space between the locking members 607) and toward the other stabilizing member 650 that originates from the same locking member 607 (i.e., into and out of the page in FIGS. 11 and 13). Such stabilizing members 650 can be formed along with the remainder of the cable hanger 600 from a flat sheet of steel that is cut into a blank and bent. The stabilizing members 650 can engage each other under a wind load and prevent the cable hanger 600 from being dislodged from its mounting location.

A further embodiment of a cable hanger, designated broadly at 700, is shown in FIGS. 14-17. The cable hanger 700 includes a base 706 with arms 705 that originate from the base 705 and extend generally perpendicularly therefrom. Each of the arms 705 includes an arcuate portion 705a, a straight segment 705c, and an inwardly-directed section 705d. The base 706 includes a mounting hole 710 similar to that described above (i.e., it is typically a nominally ¾ inch diameter unobstructed round hole). A locking portion 707 extends from the inward end of each inwardly-directed section 705d in a direction away from the base 706; each of the locking portions 707 includes a base segment 707a and a hook 707b that are arcuate in profile, and that are sized and configured to mount within a hole or sections of a hole such as that of mounting hole 710 described above. It can also be seen that the arms 705 are configured so that, when the cable hanger 700 is in a relaxed position, the locking members 707 define an angle α that is typically between about 10 and 40 degrees. In some embodiments, the straight segments 705c may include ribs or other texture 705t that can provide the operator with an enhanced grip when grasping and deflecting the cable hanger 700.

Figure 14:
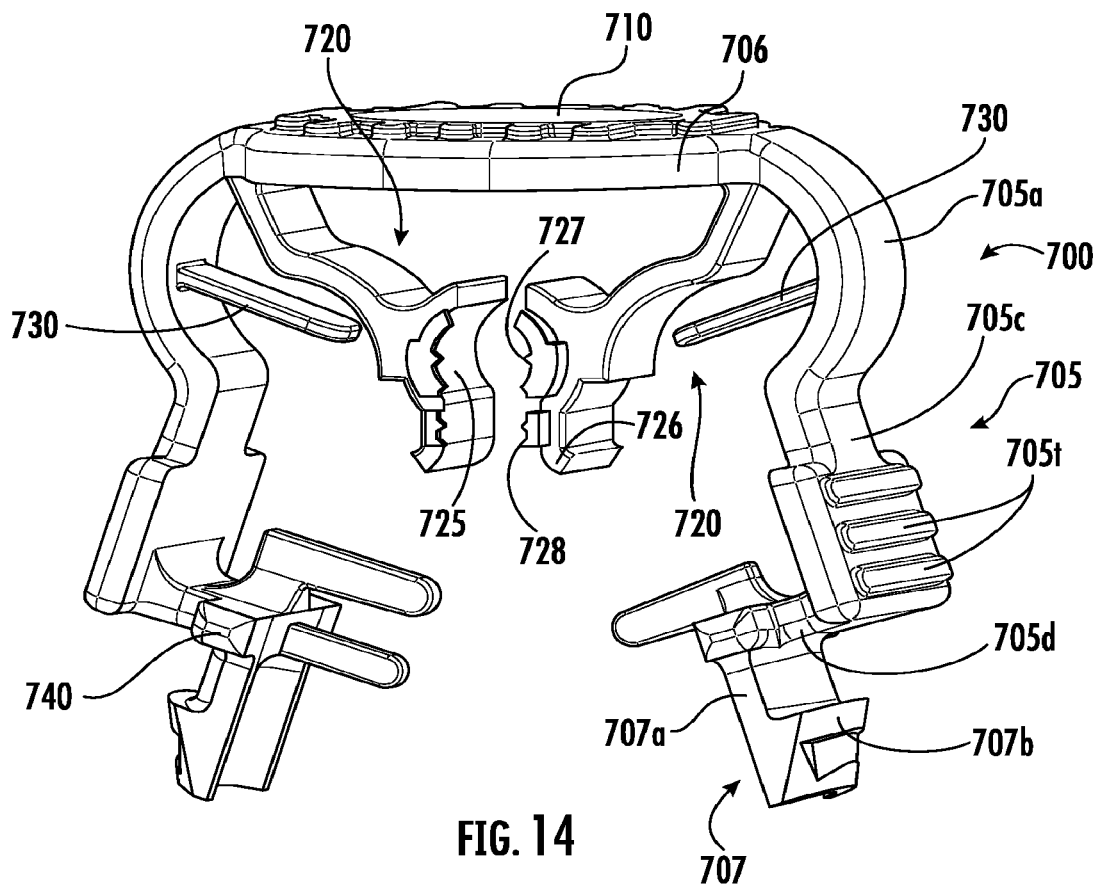
FIG. 14 is a perspective view of a cable hanger according to further embodiments of the invention.
Figure 15:
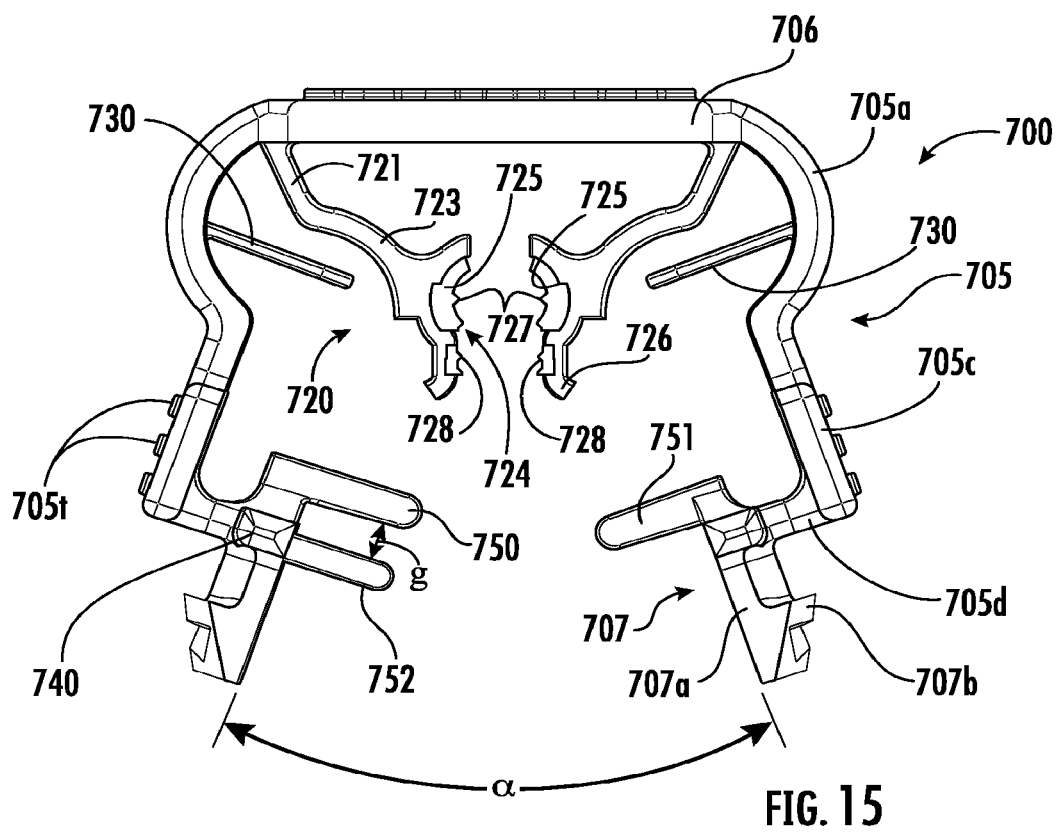
FIG. 15 is a front view of the cable hanger of FIG. 14.
Figure 16:
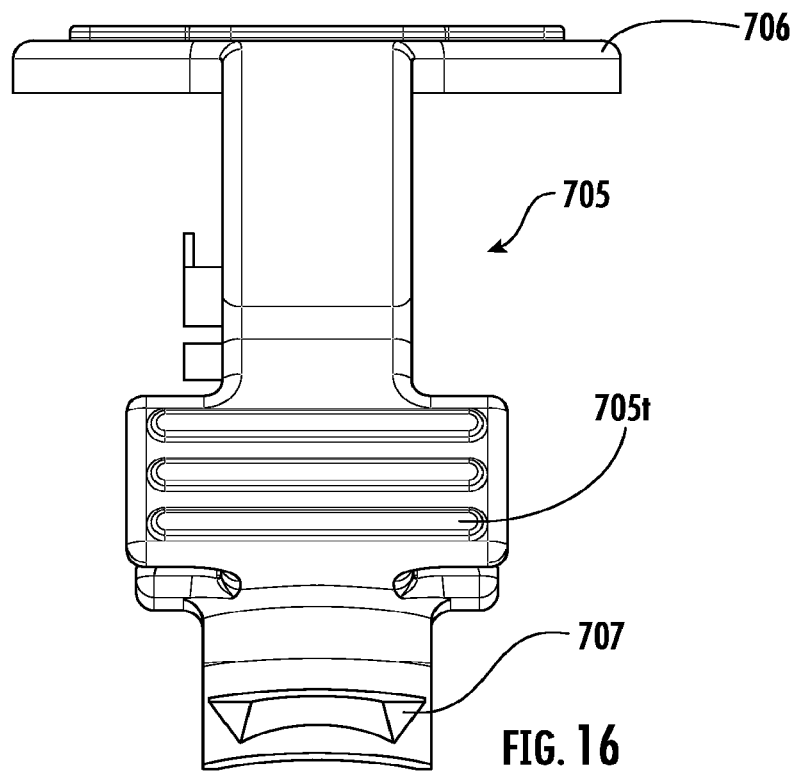
FIG. 16 is a side view of the cable hanger of FIG. 14.
Figure 17:
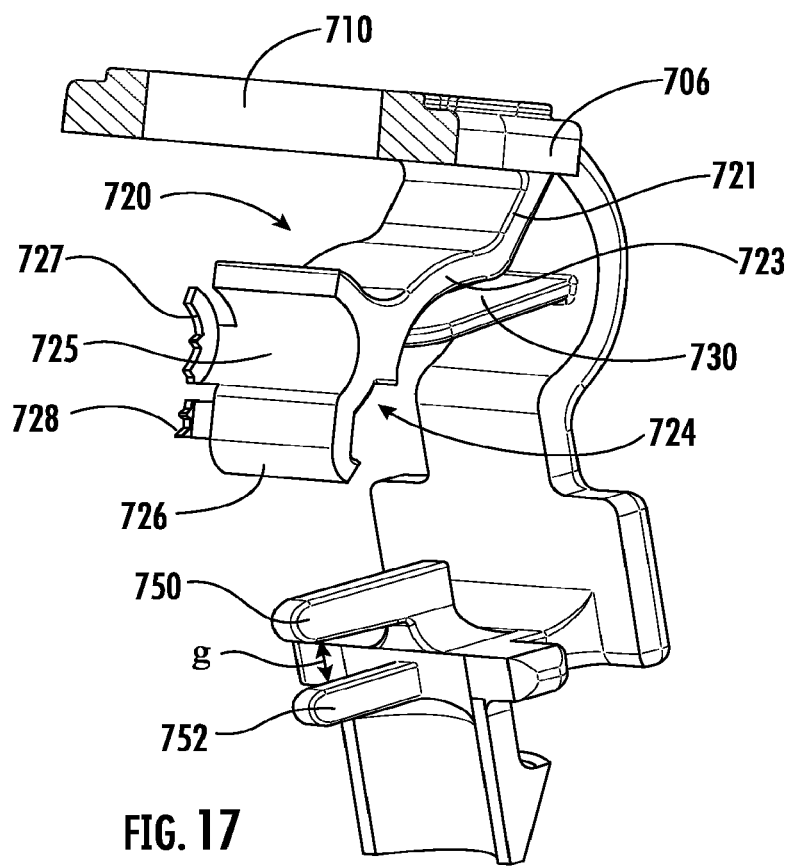
FIG. 17 is a perspective inner section view of the cable hanger of FIG. 17.

As can be seen in FIGS. 14 and 15, the cable hanger 700 includes two gripping members 720. Each of the gripping members 720 is mounted to the base 706 and extends therefrom toward the locking portions 707. Each of the gripping members 720 includes a straight section 721, an arcuate section 723, and a gripping portion 724. The gripping portion 724 includes a concave surface 725 and a guide portion 726. Notably, a toothed blade 727 is mounted adjacent the concave surface 725, and a second toothed blade 728 is mounted adjacent the guide portion 726.

The cantilevered mounting of the gripping members 720 enables them to deflect toward the arms 705 to receive a cable, then recover somewhat from such deflection to grasp and hold a cable positioned between the gripping portions 724. The toothed blades 727, 728 can assist with gripping a grasped cable. Also, in particular the toothed blade 728 can help to prevent a grasped cable (particularly a larger cable) from slipping or sliding downwardly (i.e., toward the locking portions 707). The presence of the toothed blades 727, 728 may enable the cable hanger 700 to be employed with a wider variety of cable sizes (which in turn may enable a supplier of cable hangers to manufacture fewer different cable hanger sizes, thereby lowering capital expenditures and manufacturing costs).

Similar to the cable hanger 200 of FIG. 5, the cable hanger 700 includes a straight support member 730 mounted to each arm 705. The support member 730 is mounted near the center of the arcuate portion 705a and extends at an oblique angle therefrom (in the illustrated embodiment, the support member 730 extends generally toward the center of the adjacent concave surface 725). As is the case with the cable hanger 200 above, the support members 730 are included to provide additional support and gripping force to the gripping members 720 for larger cables.

In addition, and as shown in FIGS. 14-17, the cable hanger 700 includes stabilizing members 750, 752 extending from one arm 705 and another stabilizing member 751 extending from the other arm 705. As shown in FIG. 15, a gap g is present between the stabilizing members 750, 752. When the arms 705 are drawn together to grasp a cable, the stabilizing member 751 is received within the gap g and is captured therein by the stabilizing members 750, 752. This interaction can prevent the movement of the locking members 707 toward each other under wind loading as described above.

Further, two tabs 740 extend from and in a direction normal to the ends of each of the arms 705 (see FIG. 14). The tabs 740 can overlie a surface to which the cable hanger 700 is mounted and provide a stabilizing structure (i.e., the mounting surface may be captured between the upper surfaces of the hooks 707b and the lower surfaces of the tabs 740.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

What is claimed is:

1. A cable hanger, comprising:
   a generally flat base with at least one opening;
   first and second arms extending in a first direction from opposite edges of the base;
   first and second locking members extending in the first direction from, respectively, ends of the first and second arms, each of the locking members comprising a respective hook;
   one or more gripping members, the gripping members extending from the base or one of the arms and forming a pocket configured to receive a cable;
   first and second stabilizing features, each mounted to and extending from a respective one of the first and second locking members;
   wherein the first and second locking members are forced toward each other to mount the cable hanger in a mounting location via the hooks, such movement causing the first and second gripping members to grasp the cable in the pocket; and
   wherein the first and second stabilizing features are configured so that, when the cable hanger is mounted on a mounting structure and a side load is applied to one of the first and second arms, the first and second stabilizing members engage to inhibit relative movement of the first and second locking members; and
   wherein the locking members are splayed laterally as they extend in the first direction to define an angle of between about 10 and 30 degrees.

2. The cable hanger defined in claim 1, wherein the first stabilizing feature comprises a first member extending from the first locking member.

3. The cable hanger defined in claim 2, wherein the second stabilizing feature comprises a second member extending from the second locking member.

4. The cable hanger defined in claim 3, wherein the second stabilizing feature comprises a third member extending from the second locking member.

5. The cable hanger defined in claim 4, wherein the first member is offset from the second and third members.

6. The cable hanger defined in claim 1, formed of a polymeric material.

7. The cable hanger defined in claim 1, wherein the at least one gripping member is first and second gripping members.

8. The cable hanger defined in claim 7, wherein each of the first and second gripping members has a free end.

9. The cable hanger defined in claim 1, wherein at least a portion of the first stabilizing feature is inserted into the second stabilizing feature when the cable hanger is mounted on a mounting structure.

10. A cable hanger, comprising:
    a generally flat base with at least one opening;
    first and second arms extending in a first direction from opposite edges of the base;
    first and second locking members extending in the first direction from, respectively, ends of the first and second arms, each of the locking members comprising a respective hook;
    one or more gripping members, the gripping members extending from the base or one of the arms and forming a pocket configured to receive a cable;
    first and second stabilizing features, each mounted to and extending from a respective one of the first and second locking members;
    wherein the first and second locking members are forced toward each other to mount the cable hanger in a mounting location via the hooks, such movement causing the first and second gripping members to grasp the cable in the pocket; and
    wherein the first and second stabilizing features are configured so that, when the cable hanger is mounted on a mounting structure and a side load is applied to one of the first and second arms, the first and second stabilizing members engage to inhibit relative movement of the first and second locking members; and
    wherein the locking members are splayed laterally as they extend in the first direction.

11. The cable hanger defined in claim 10, wherein the first stabilizing feature comprises a first member extending from the first locking member.

12. The cable hanger defined in claim 11, wherein the second stabilizing feature comprises a second member extending from the second locking member.

13. The cable hanger defined in claim 12, wherein the second stabilizing feature comprises a third member extending from the second locking member.

14. The cable hanger defined in claim 13, wherein the first member is offset from the second and third members.

15. The cable hanger defined in claim 10, formed of a polymeric material.

16. The cable hanger defined in claim 10, wherein the at least one gripping member is first and second gripping members.

17. The cable hanger defined in claim 16, wherein each of the first and second gripping members has a free end.

18. The cable hanger defined in claim 10, wherein the first and second arms have a first width, and the base has a second width that is greater than the first width.

19. A cable hanger, comprising:

a generally flat base with at least one opening;

first and second arms extending in a first direction from opposite edges of the base;

first and second locking members extending in the first direction from, respectively, ends of the first and second arms, each of the locking members comprising a respective hook;

one or more gripping members, the gripping members extending from the base or one of the arms and forming a pocket configured to receive a cable;

first and second stabilizing features, each mounted to and extending from a respective one of the first and second locking members;

wherein the first and second locking members are forced toward each other to mount the cable hanger in a mounting location via the hooks, such movement causing the first and second gripping members to grasp the cable in the pocket; and wherein the first and second arms have a first width, and the base has a second width that is greater than the first width.

20. The cable hanger defined in claim 19, wherein the base is generally round.

* * * * *